(12) United States Patent
Matsumoto (10) Patent No.: US 10,369,848 B2
(45) Date of Patent: Aug. 6, 2019

(54) STUD PIN, AND PNEUMATIC TIRE (71) Applicant: The Yokohama Rubber Co., LTD., Minato-ku, Tokyo (JP)

(72) Inventor: Kenichi Matsumoto, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 61 days.

(21) Appl. No.: 14/907,082

(22) PCT Filed: Jul. 1, 2014

(86) PCT No.: PCT/JP2014/067523
§ 371 (c)(1),
(2) Date: Jan. 22, 2016

(87) PCT Pub. No.: WO2015/012070
PCT Pub. Date: Jan. 29, 2015

(65) Prior Publication Data
US 2016/0159164 A1    Jun. 9, 2016

(30) Foreign Application Priority Data

Jul. 24, 2013 (JP) ................................. 2013-153900

(51) Int. Cl.
*B60C 11/16* (2006.01)
(52) U.S. Cl.
CPC ...... *B60C 11/1637* (2013.01); *B60C 11/1625* (2013.01); *B60C 11/1643* (2013.01); *B60C 11/1668* (2013.01); *B60C 11/1675* (2013.01)
(58) Field of Classification Search
CPC ............. B60C 11/1637; B60C 11/1625; B60C 11/1675
(Continued)

(56) References Cited

U.S. PATENT DOCUMENTS 3,578,053 A * 5/1971 Milliken ................. B60C 11/16
 152/210
5,324,369 A  6/1994 Yamada
(Continued)

FOREIGN PATENT DOCUMENTS

AT    189524 B  *  4/1957
CH    406 876       1/1966
(Continued)

OTHER PUBLICATIONS

International Search Report for International Application No. PCT/JP2014/067523 dated Sep. 9, 2014, 4 pages, Japan.

*Primary Examiner* — Robert C Dye
*Assistant Examiner* — Nicholas R Krasnow
(74) *Attorney, Agent, or Firm* — Thorpe North & Western (57) ABSTRACT

A stud pin fitted into a tread portion of a pneumatic tire comprises a buried base portion extending in a direction, the buried base portion securing the stud pin in the tread portion by being pressed by a side surface of the stud pin installation hole upon the stud pin being embedded in the stud pin installation hole, and a tip portion connected to an end portion of the buried base portion in the extending direction, the tip portion protruding past the tread portion and coming into contact with a road surface upon the buried base portion being embedded in the stud pin installation hole. A connection portion of the tip portion with the buried base portion has a cross-sectional area in a plane orthogonal to the extending direction of the buried base portion greater than an area of the tip end surface.

5 Claims, 6 Drawing Sheets (58) Field of Classification Search
USPC .......................................................... D12/608
See application file for complete search history.

(56) References Cited

U.S. PATENT DOCUMENTS

| | | | | |
|---|---|---|---|---|
| 5,980,001 A * | 11/1999 | Rubel | ................... | B62D 55/27 |
| | | | | 305/162 |
| 8,113,250 B2 * | 2/2012 | Eromaki | ................. | B60C 11/12 |
| | | | | 152/210 |
| 2011/0088823 A1 * | 4/2011 | Cuny | ................. | B60C 11/1643 |
| | | | | 152/210 |

FOREIGN PATENT DOCUMENTS

| | | | | |
|---|---|---|---|---|
| EP | 0 518 539 | | 12/1992 | |
| EP | 1 531 065 | | 5/2005 | |
| EP | 2 165 859 | | 3/2010 | |
| EP | 2682285 A1 * | | 1/2014 | ......... B60C 11/1643 |
| FI | 68.863 | | 7/1968 | |
| JP | S48-012649 | | 4/1973 | |
| JP | S56-04906 | | 1/1981 | |
| JP | S58-026610 | | 2/1983 | |
| JP | 2010-095212 | | 3/2010 | |
| RU | 2 038 221 | | 6/1995 | |
| RU | 2280564 C1 * | | 7/2006 | ......... B60C 11/1675 |
| WO | WO 2009/068744 | | 6/2009 | |
| WO | WO 2012/117962 | | 9/2012 | |
| WO | WO-2014102936 A1 * | | 7/2014 | ......... B60C 11/1643 |

* cited by examiner

STUD PIN, AND PNEUMATIC TIRE

TECHNICAL FIELD

The present technology relates to a stud pin fitted to the tread portion of a pneumatic tire, and a pneumatic tire fitted with the stud pin.

BACKGROUND ART

Conventional snow tires provide grip on icy road surfaces via stud pins fitted into the tread portion of the tire.

Typical stud pins are embedded in a stud pin installation hole provided on the tread portion. When stud pins are embedded in a stud pin installation hole, the stud pin installation hole expands in diameter. By inserting stud pins into a stud pin installation hole in this state, the stud pins are firmly embedded in the stud pin installation hole. As a result, stud pins are prevented from falling out from the stud pin installation holes upon receiving forces upon breaking or accelerating or lateral forces from the road surface during rolling motion of the tire.

A spike for a tire (stud pin) that can realize enhanced clawing force against a surface of ice and weight reduction is known (International Patent Publication No. WO/2012/117962). The stud pin is provided with a columnar body to be secured to the tread surface with its one end side in the direction along its central axis fitted into a bottomed hole formed in the tread surface of the tire, and a pin protruding from the other end face of the columnar body in the direction along its central axis. The pin is shaped as an odd-shaped columnar body protruding from the other end face of the columnar body and having recessed portions formed by removing portions straddling the other end face and the peripheral surface of a cylindrical body to extend in the direction along the central axis of the columnar body.

However, snow tires with stud pins travel not only on icy road surfaces, but also on concrete road surfaces and asphalt road surfaces. Concrete road surfaces and asphalt road surfaces are harder than icy road surfaces. On such surfaces, the forces received from the hard road surface cause many stud pins to fall out from the tire when braking, accelerating, or cornering.

SUMMARY

The present technology provides a stud pin that does not easily fall out from a tire that improves the performance on ice of a pneumatic tire and further reduces the number of stud pins that fall out upon traveling on concrete road surfaces and asphalt road surfaces, and a pneumatic tire fitted with the stud pin.

One aspect of the present technology is a stud pin that fits into a stud pin installation hole on a tread portion of a pneumatic tire. The stud pin comprises a buried base portion extending in a direction, the buried base portion securing the stud pin in the tread portion by being pressed by a side surface of the stud pin installation hole upon the stud pin being embedded in the stud pin installation hole, and a tip portion connected to an end portion of the buried base portion in the extending direction, the tip portion protruding past the tread portion and coming into contact with a road surface upon the buried base portion being embedded in the stud pin installation hole. The tip portion comprises a tip end surface perpendicular to the extending direction of the buried base portion, and a connection portion of the tip portion with the buried base portion has a cross-sectional area in a plane orthogonal to the extending direction of the buried base portion greater than an area of the tip end surface.

Here, an area ratio $S_2/S_1$ is preferably from 1.25 to 7.5, where $S_1$ is the area of the tip end surface, and $S_2$ is the cross-sectional area of the connection portion.

Preferably, the buried base portion comprises a flat surface from which the tip portion protrudes, the tip portion comprises an inclined side surface extending from the tip end surface to the buried base portion, and an angle of inclination of the inclined side surface with respect to the flat surface of the buried base portion is from 30 to 60 degrees.

The tip end surface is preferably a polygonal shape. For example, a triangular shape, a quadrangular shape, a pentagonal shape, and the like are preferable. In particular, the tip end surface is preferably a 4×n-gon shape (where n is a natural number; examples include a quadrangular shape, an octogonal shape, a dodecagonal shape, and the like). By the tip end surface having a 4×n-gon shape, tire braking performance can be improved due to the sides disposed in, for example, the tire circumferential direction and the tire width direction.

Also, the tip end surface is preferably a concave-polygonal shape. Here, a concave polygon means a polygon with at least one internal angle greater than 180 degrees, for example a cross shaped or a star shaped polygon. The concave polygon preferably has 4n number of vertices (where n is a natural number).

Note that the corners of the polygon may be rounded. Also, part of or the entirety of a side of the polygon may be an arc.

The tip portion is preferably a truncated polygonal pyramid. For example, a truncated triangular pyramid, a truncated pentagonal pyramid, and the like are preferable.

In particular, the tip portion is preferably a truncated quadrangular pyramid.

Preferably, the tip end surface is a rectangular shape, and the tip portion comprises a pair of inclined side surfaces extending from two opposing sides to the buried base portion. The corners of the polygon may be rounded. Also, part of or the entirety of a side of the polygon may be an arc. Preferably, the tip portion comprises a pair of inclined side surfaces extending from sides in the lateral direction of the rectangular shape to the buried base portion. The stud pin is preferably installed in the stud pin installation hole with the longitudinal direction of the rectangular shape aligned with the tire circumferential direction. As a result of this configuration, by the inclined side surfaces facing the tire circumferential direction, the moment acting upon the stud pin can be reduced, and by the sides in the longitudinal direction, the braking performance with respect to the forces in the tire width direction can be improved.

Preferably, the tip end surface is a quadrangular shape, a cross section of the connection portion of the tip portion with the buried base portion in the plane orthogonal to the extending direction of the buried base portion is cross shaped, and four inclined side surfaces are provided extending from four sides of the tip end surface to four end portions of the cross shape. Preferably, one pair of the four inclined side surfaces is disposed facing the tire circumferential direction, and the other pair of inclined side surfaces is disposed facing the tire width direction.

Preferably, the tip end surface is cross shaped, and a cross section of the connection portion of the tip portion with the buried base portion in the plane orthogonal to the extending direction of the buried base portion is cross shaped, and four inclined side surfaces extend from four end portions of the cross shaped tip end surface to the buried base portion. Preferably, one pair of the four inclined side surfaces is disposed facing the tire circumferential direction, and the other pair of inclined side surfaces is disposed facing the tire width direction.

Preferably,the buried base portion comprises, in order from the tip portion side, a body portion, a shank portion having a maximum outer diameter less than that of the body portion, and a bottom portion having a maximum outer diameter greater than that of the body portion and that of the shank portion, and the body portion comprises on the outer peripheral surface thereof a plurality of recessed portions.

Preferably, the tip portion is a truncated concave-polygonal pyramid, the tip portion comprising four recessed portions separated in the circumferential direction;

the tip end surface and the connection portion of the tip portion with the buried base portion have a cross section in the plane orthogonal to the extending direction of the buried base portion that, as a whole, is a concave polygon shaped like a cross;

the buried base portion comprises, in order from the tip portion side, the body portion, the shank portion having the maximum outer diameter less than that of the body portion, and the bottom portion having the maximum outer diameter greater than that of the body portion and that of the shank portion;

the body portion comprises on the outer peripheral surface thereof four recessed portions separated in the circumferential direction; and the recessed portions of the tip portion and the recessed portions of the body portion are provided arranged in the same direction with respect to a central axis of the stud pin.

Also, preferably the bottom portion comprises on the outer peripheral surface thereof four recessed portions separated in the circumferential direction; and the recessed portions of the tip portion and the recessed portions of the bottom portion are provided arranged in the same direction with respect to a central axis of the stud pin.

Also, another aspect of the present technology is a pneumatic tire. The pneumatic tire is fitted with the stud pin described above fitted in the stud pin installation hole on a tread portion of the pneumatic tire.

According to the aspects described above, a stud pin that improves the performance on ice of a pneumatic tire and that does not easily fall out from the pneumatic tire can be provided. Also, a pneumatic tire into which stud pins are fitted can be provided. The pneumatic tire improves performance on ice, and the number of stud pins falling out from the pneumatic tire is less than that of conventional stud pins.

DESCRIPTION OF EMBODIMENTS

Overall Explanation of the Tire

Figure 1:
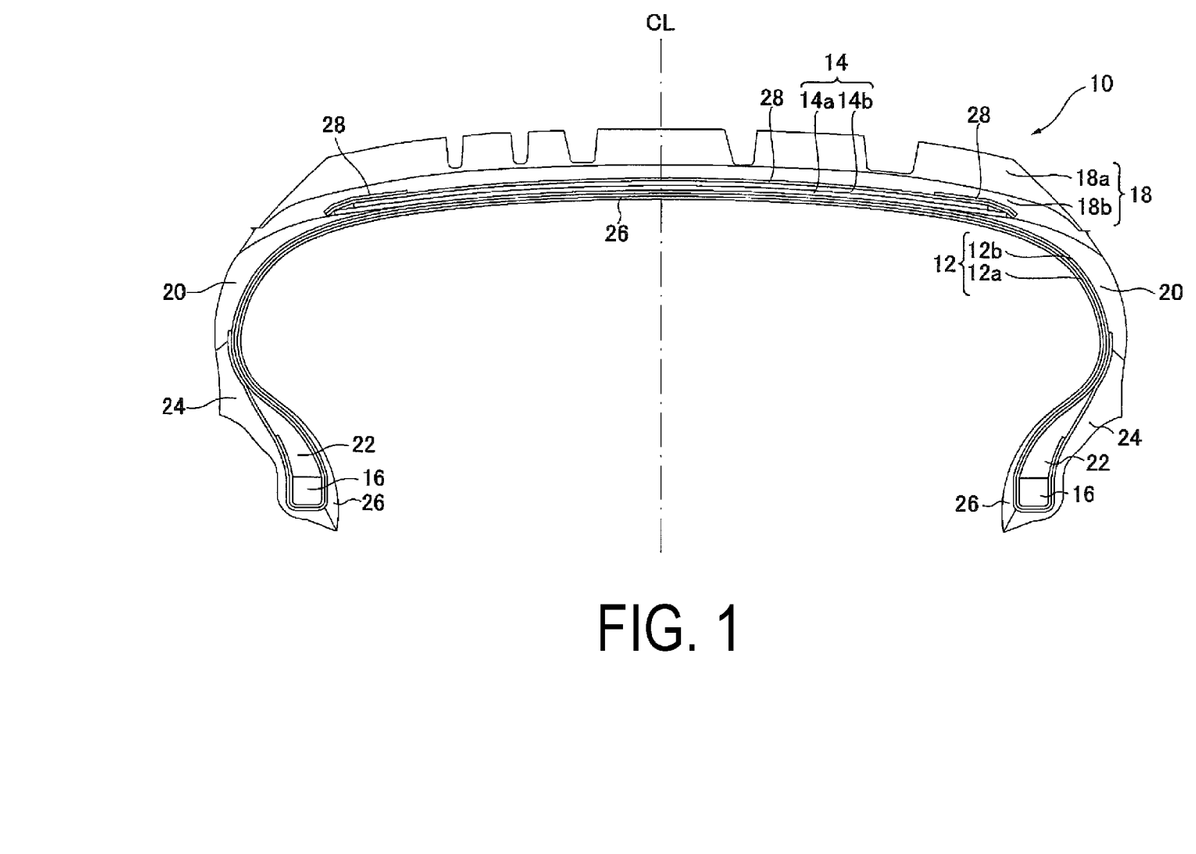
FIG. 1 is a tire cross-sectional view illustrating a cross section of a pneumatic tire of an embodiment.

Below, a pneumatic tire of the present embodiment is described. FIG. 1 is a tire cross-sectional view illustrating a cross section of a pneumatic tire (hereinafter referred to as "tire") 10 of the present embodiment. The tire 10 is a studded tire with stud pins embedded in a tread portion.

The tire 10 is, for example, a tire for a passenger vehicle. A tire for a passenger vehicle refers to a tire defined according to Chapter A of the JATMA Yearbook 2012 (standards of The Japan Automobile Tyre Manufacturers Association, Inc.). The tire 10 can also be a small truck tire as defined in Chapter B or a truck tire or bus tire as defined in Chapter C.

Below, values of the dimensions of various pattern elements are described in detail as an example values for a tire for a passenger vehicle. However, the pneumatic tire of the present technology is not limited to these example values.

The "tire circumferential direction" described below is the direction of rotation (in both directions) of the tread surface when the tire 10 rotates about the tire rotation axis of the tire. The "tire radial direction" is the direction that extends radially orthogonal to the tire rotation axis. The "outer side in the tire radial direction" is the direction away from the tire rotation axis in the tire radial direction. The "tire width direction" is the direction aligned with the direction of the tire rotation axis. The "outer side in the tire width direction" is the direction away from the tire center line CL of the tire 10 in both directions.

Tire Structure

The tire 10 includes a carcass ply layer 12, a belt layer 14, and bead cores 16 as skeleton members. The tire 10 mainly includes a tread rubber member 18, sidewall rubber members 20, bead filler rubber members 22, rim cushion rubber members 24, and an inner liner rubber member 26, around these skeleton members.

The carcass ply layer 12 of the tire 10 illustrated in FIG. 1 includes carcass ply members 12a, 12b extending between the pair of annular bead cores 16 and wrapped in a toroidal shape. The carcass ply members 12a, 12b are made from organic fibers covered with rubber. The carcass ply layer 12 may be formed from a single carcass ply member.

The belt layer 14 is provided on the outer side in the tire radial direction of the carcass ply layer 12, and is constituted by two belt members 14a, 14b. The belt members 14a, 14b are members made from steel cords covered in rubber. The belt members 14a, 14b are disposed inclined at a predetermined angle of, for example, from 20 to 30 degrees, with respect to the tire circumferential direction. The lower layer belt member 14a has a width in the tire width direction greater than the width of the upper layer belt member 14b. The steel cords of the belt members 14a, 14b are inclined in the direction opposite to one another with respect to the tire circumferential direction and cross one another. The belt layer 14 prevents or minimizes the expansion of the carcass ply layer 12 caused by the pressure of the air in the tire cavity region formed between the tire 10 and the rim.

The tread rubber member 18 is provided on the outer side in the tire radial direction of the belt layer 14. The sidewall rubber members 20 are connected to both end portions of the tread rubber member 18 to form sidewall portions.

The tread rubber material 18 is made of two rubber layers: an upper layer tread rubber material 18*a* provided on the outer side in the tire radial direction and a lower layer tread rubber material 18*b* provided on the inner side in the tire radial direction.

The rim cushion rubber member 24 is provided at the end of the sidewall rubber member 20 on the inner side in the tire radial direction. The rim cushion rubber member 24 comes into contact with the rim on which the tire 10 is mounted.

The bead filler rubber member 22 is provided on the outer side of the bead core 16 in the tire radial direction so as to be interposed between the carcass ply layer 12 wound around the bead core 16. The inner liner rubber member 26 is provided on an inner surface of the tire 10 facing a tire cavity region.

In addition, the tire 10 is provided with a belt cover layer 28 that covers the surface of the belt layer 14 on the outer side in the tire radial direction. The belt cover layer 28 is made from organic fibers covered with rubber.

The tire 10 has such a tire structure, but the structure of the pneumatic tire according to the present technology is not limited to the tire structure illustrated in FIG. 1.

Tread Pattern

Figure 2:
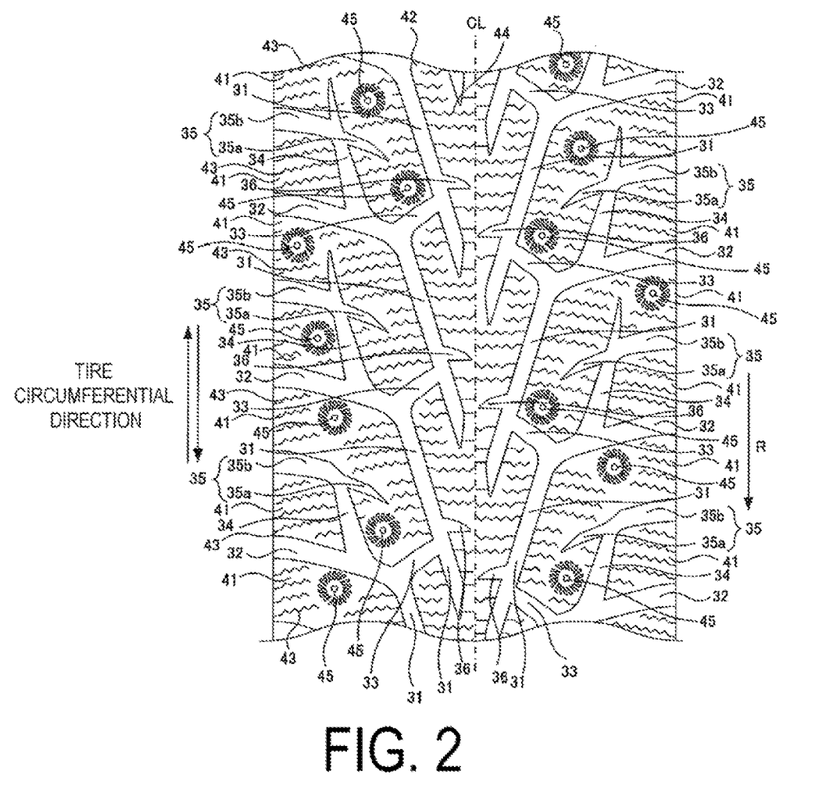
FIG. 2 is a planar development diagram illustrating a portion of a tread pattern of the tire of an embodiment developed on a plane.

FIG. 2 is a planar development diagram illustrating a portion of the tread pattern of a tread pattern 30 of the tire 10 developed on a plane. As illustrated in FIG. 2, the tire 10 has a first orientation in the tire circumferential direction designated by rotational direction R. The orientation of the rotational direction R is designated by displaying numbers, symbols, and the like on the sidewall surface of the tire 10. In FIG. 2, stud pins fitted into the tread portion are omitted. The stud pin (see FIG. 3) is fitted into the pin installation holes illustrated in FIG. 2.

The tread pattern 30 is provided with a plurality of first inclined grooves 31, a plurality of first lug grooves 32, a plurality of second inclined grooves 33, a plurality of third inclined grooves 34, second lug grooves 35, and fourth inclined grooves 36. In FIG. 2, the symbol CL indicates the tire center line.

The first inclined grooves 31 are provided in plurality in the tire circumferential direction. Each of the first inclined grooves 31 has a position located separated from the center line CL as a starting end, extends from the starting end in the opposite direction to the tire rotation direction R, and extends at an inclination towards the outer side in the tire width direction. The first inclined grooves 31 have a shape in which the groove width gradually widens towards the outer side in the tire width direction, and the groove width gradually narrows towards the starting end.

The first lug grooves 32 are provided in plurality in the tire circumferential direction. The first lug grooves 32 extend from the end portion of the first inclined grooves 31 on the outer side in the tire width direction in the opposite direction to the tire rotation direction R and extend at an inclination towards the outer side in the tire width direction beyond the ground contact edge.

The second inclined grooves 33 are provided in plurality in the tire circumferential direction. The second inclined grooves 33 extend from the end portion of the first inclined grooves 31 on the outer side in the tire width direction in the opposite direction to the tire rotation direction R and extend at an inclination towards the inner side in the tire width direction reaching an adjacent first inclined groove 31.

The third inclined grooves 34 are provided in plurality in the tire circumferential direction. Each of the third inclined grooves 34 extends from an intermediate point on the first lug grooves 32 in the opposite direction to the tire rotation direction R and extends at an inclination towards the outer side in the tire width direction. The third inclined grooves 34 have a shape in which the groove width gradually narrows towards the outer side in the tire width direction and gradually widens towards the inner side in the tire width direction.

The second lug grooves 35 extend between two of the first lug grooves 32 located adjacent to each other in the tire circumferential direction aligned with the first lug grooves 32 without crossing with the first inclined grooves 31 and the second inclined grooves 33.

The third inclined grooves 34 extend through the second lug grooves 35. The width of portions 35*a* of the second lug grooves 35 on the inner side in the tire width direction of the crossing sections with the third inclined grooves 34 is narrower than the width of portions 35*b* on the outer side in the tire width direction of the crossing sections with the third inclined grooves 34.

The fourth inclined grooves 36 extend from an intermediate point on the first inclined grooves 31 in one direction in the tire circumferential direction and extend at an inclination towards the inner side in the tire width direction.

Sipes 43 are provided in land portions 41 that are enclosed by the first inclined grooves 31, the first lug grooves 32, the second inclined grooves 33, and the tread ground contact edge. Also, sipes 44 are provided in land portions 42 on the inner side in the tire width direction of the first inclined grooves 31 and the second inclined grooves 33. The sipes 44 extend substantially parallel to the tire width direction. The sipes 43 incline with respect to the sipes 44. With the sipes 43 being inclined with respect to the sipes 44, it is possible to increase the turning performance of the tire 10.

Also, stud pin installation holes 45 are provided in the land portions 41 enclosed by the first inclined grooves 31, the first lug grooves 32, the second inclined grooves 33, and the tread ground contact edges, as illustrated in FIG. 2. By fitting stud pins 50A, which are described below, into the stud pin installation holes 45, the tire 10 functions as a studded tire, and the performance on ice, namely the braking on ice and the turning on ice performances, is improved.

Stud Pin

Figure 3:
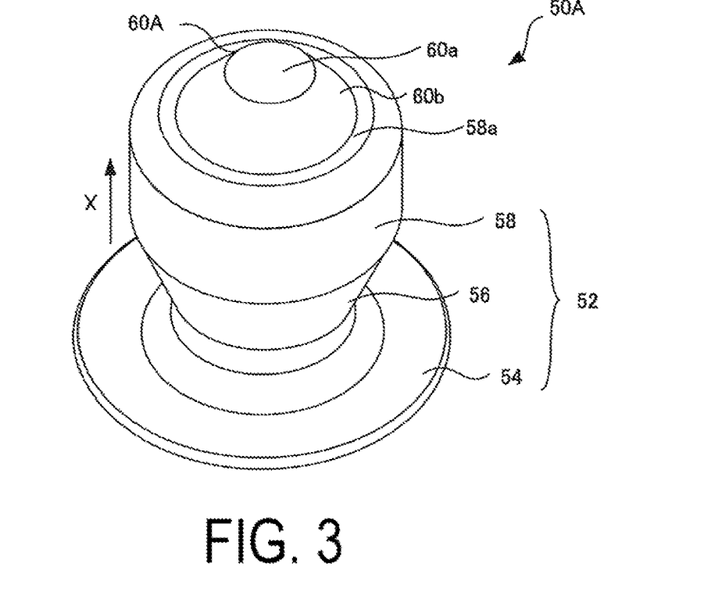
FIG. 3 is an external perspective view illustrating a stud pin 50A of the first embodiment of the present technology.
Figure 4:
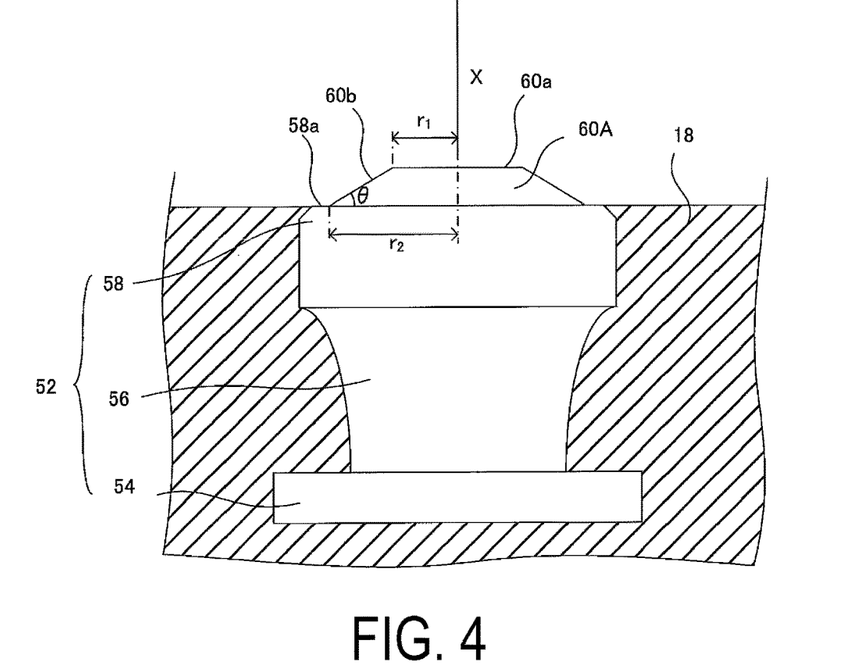
FIG. 4 is a side view illustrating the stud pin 50A fitted into the tread portion.

FIG. 3 is an external perspective view illustrating the stud pin 50A of the first embodiment of the present technology. FIG. 4 is a side view illustrating the stud pin 50A fitted into the stud pin installation hole 45 provided on the tread rubber material 18 of the tread portion.

The stud pin 50A mainly includes a buried base portion 52 and a tip portion 60A. The buried base portion 52 is embedded in the tread portion of the pneumatic tire to be mounted. The stud pin 50A is secured in the tread portion by the side surface of the buried base portion 52 being pressed by the tread rubber material 18 via the side surface of the stud pin installation hole 45. The stud pin 50A is formed of the buried base portion 52 and the tip portion 60A in the stated order in the X-direction. Note that the X-direction corresponds to the extending direction of the buried base portion 52 toward the tip portion 60, and the normal line direction relative to the tread surface of the tread portion when the stud pin 50A is fitted into the stud pin installation hole 45.

The buried base portion 52 includes a bottom portion 54, a shank portion 56, and a body portion 58. The bottom portion 54, the shank portion 56, and the body portion 58 are formed in the stated order in the X-direction.

The bottom portion 54 is located on an end portion opposite the tip portion 60A. The bottom portion 54 is shaped like a disc-shaped flange. The bottom portion 54 prevents rotation of the stud pin 50A in the stud pin installation hole 45 when the stud pin 50A receives forces from the road surface.

The shank portion 56 connects the body portion 58 to the bottom portion 54. The shank portion 56 is a truncated cone. The diameter of the shank portion 56 is less than the maximum outer diameter of the bottom portion 54 and that of the body portion 58. Consequently, the shank portion 56 is recessed relative to the body portion 58 and the bottom portion 54, and the bottom portion 54 and the body portion 58 are formed like flanges.

The body portion 58 is cylindrical. The body portion 58 is located between the shank portion 56 and the tip portion 60A. The body portion 58 is the flange-shaped portion connected to the tip portion 60A. The body portion 58 is embedded in the tread rubber material 18, with an upper end surface 58a of the body portion 58 being exposed, flush with the tread surface when the stud pin 50A is fitted into the tire 10.

As illustrated in FIG. 4, the tip portion 60A protrudes past the tread surface when the stud pin 50A is fitted into the tread portion. The tip portion 60A is the portion that comes into contact with the road surface and claws into the ice. The tip portion 60A is the truncated cone portion protruding from the upper end surface 58a of the buried base portion 52. The tip portion 60A includes a tip end surface 60a (an end surface in the X-direction) perpendicular to the extending direction of the buried base portion 52 (X-direction). The tip portion 60A includes an inclined side surface 60b extending from the peripheral portion of the tip end surface 60a to the upper end surface 58a of the buried base portion 52. The inclined side surface 60b has an acute angle of inclination θ with respect to the upper end surface 58a of the body portion 58. The angle of inclination is preferably from 30 to 60 degrees. In the first embodiment of the present technology, as described below, the moment of the normal force the inclined side surface 60b receives from the road surface acting upon the stud pin 50A can be reduced. As a result, occurrences of the stud pin 50A falling out from the tread portion are reduced.

The tip portion 60A may be made of the same metal material as that of the buried base portion 52 or of different metal material. For example, the buried base portion 52 and the tip portion 60A may be made from aluminum. Also, the buried base portion 52 may be made from aluminum and the tip portion 60A may be made from tungsten carbide. In the case that the buried base portion 52 and the tip portion 60A are made from different metal materials, the tip portion 60A can be anchored to the buried base portion 52 by mating a protruding portion (not illustrated) provided on the tip portion 60A with a hole (not illustrated) formed in the upper end surface 58a of the body portion 58 of the buried base portion 52.

The tip end surface 60a is circular. The connection portion of the tip portion 60A with the buried base portion 52 has a circular cross section when sectioned along the plane orthogonal to the X-direction. As illustrated in FIG. 4, the radius $r_2$ of the cross section of the connection portion is greater than the radius $r_1$ of the tip end surface 60a. Thus, $S_2 > S_1$ is satisfied; where $S_1$ is the area of the tip end surface 60a and $S_2$ is the cross-sectional area of the connection portion of the tip portion 60A, which connects to the buried base portion 52, when sectioned in the direction orthogonal to the X-direction. The side surface of the tip portion 60A in the tire circumferential direction is inclined with respect to the tire circumferential direction. As a result, as described below, the moment produced by the forces the tip portion 60A receives from the road surface can be reduced. Consequently, occurrences of the stud pins 50A falling out from the tread portion can be reduced.

Figure 5:
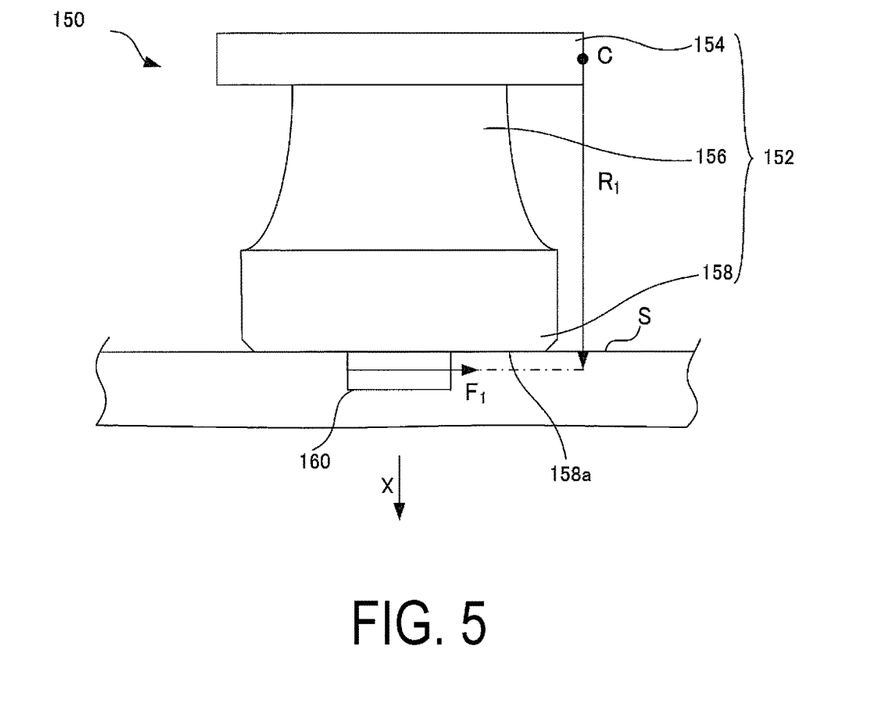
FIG. 5 is a schematic view for explaining the forces acting upon a conventional stud pin 150 received from the road surface S.

FIG. 5 is a schematic view illustrating a tip portion 160 of a conventional stud pin 150 clawing into the road surface S. The side surface of the conventional tip portion 160 is perpendicular to a tip end surface 158a. Consequently, the cross sectional area of the tip portion 160 when the tip portion 160 is sectioned in the direction orthogonal to the X-direction is a constant value regardless of the position at which the tip portion 160 is sectioned. When the side surface of the tip portion 160 receives a force $F_1$ from the road surface S, the force $F_1$ causes the stud pin 150 to attempt to rotate about an end point C of a bottom portion 154 and fall out from the stud pin installation hole 45. At this time, the moment $N_1$ about the end point C is represented by:

$N_1 = R_1 \times F_1$; where $R_1$ is the distance (vector) from the end point C to the force $F_1$.

The greater the moment $N_1$, the more likely the stud pin is to fall out from the tread portion.

Figure 6:
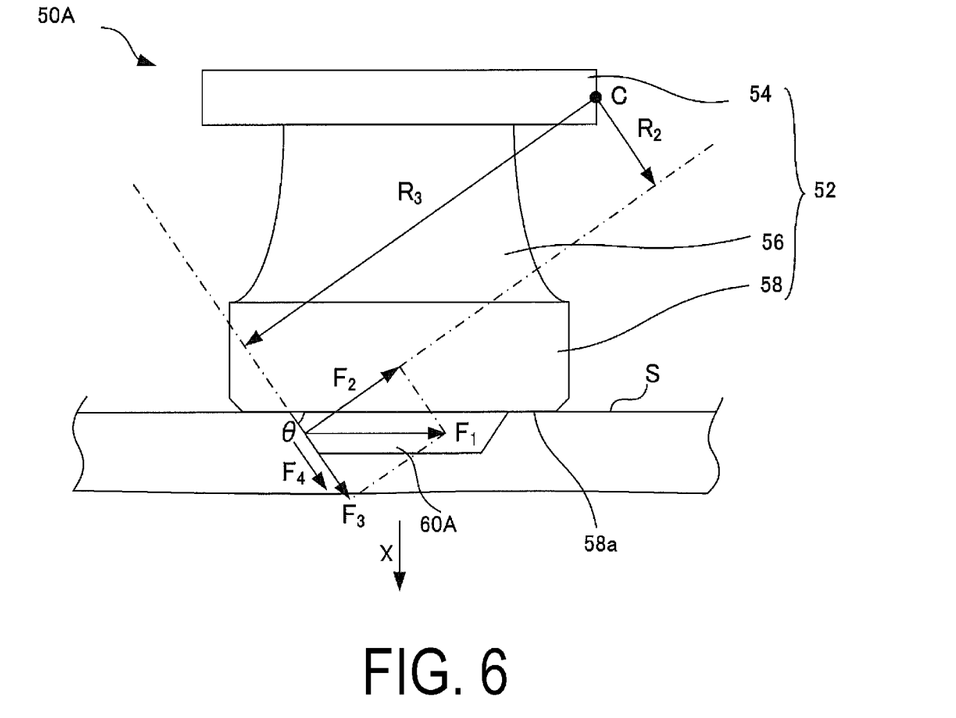
FIG. 6 is a schematic view for explaining the forces acting upon a stud pin 50A received from the road surface S.

FIG. 6 is a schematic view illustrating the tip portion 60A of the stud pin 50A of the present embodiment clawing into the road surface S. The stud pin 50A of the present embodiment has a configuration in which the inclined side surface 60b of the tip portion 60A is inclined with respect to the upper end surface 58a. As a result, the force $F_1$ that the inclined side surface 60b receives from the road surface S is resolved into a normal force $F_2$ and a static friction force $F_3$ between the inclined side surface 60b and the road surface S.

Here, $F_2 = F_1 \sin \theta$; where θ is the angle formed by the inclined side surface 60b and the upper end surface 58a.

Also, component $F_1 \cos \theta$ of the force $F_1$ aligned with the inclined side surface 60b is equal to the component $F_1 \cos \theta$ of the friction force $F_3$ when the static friction force between the inclined side surface 60b and the road surface S is not greater than the maximum static friction force. In other words, $F_3 = F_1 \cos \theta$ Here, the moment $N_1$ of the force $F_1$ about the end point C is resolved into moment $N_2$ of the normal force $F_2$ about the end point C and moment $N_3$ of the friction force $F_3$ about the end point C. At this time, $N_1 = N_2 + N_3$ is established.

The moment $N_2$ of the normal force $F_2$ about the end point C is $N_2 = R_2 \times F_2$; where $R_2$ is the distance (vector) from the end point C to the normal force $F_2$.

The moment $N_3$ of the friction force $F_3$ about the end point C is $N_3 = R_3 \times F_3$; where $R_3$ is the distance (vector) from the end point C to the friction force $F_3$.

When force $F_1$ increases and the component $F_1 \cos \theta$ exceeds the maximum friction force, the inclined side surface 60b slides a small degree against the road surface S. Note that the amount of slippage by the inclined side surface 60b against the road surface S is minimal compared to the length of the inclined side surface 60b in the tire circumferential direction. At this time, the friction force $F_4$ is $F_4 = \mu F_2 = \mu F_1 \sin \theta$ ($< F_3$).

Here, μ is the dynamic coefficient of friction between the road surface S and the inclined side surface 60b.

However, when the force $F_1$ increases and the component $F_1 \cos \theta$ exceeds the maximum friction force, the friction force $F_4$ described above becomes less than the component of force $F_1$ aligned with the inclined side surface 60b ($F_3 = F_1 \cos \theta$).

The moment $N_4$ of the friction force $F_4$ about the end point C is $N_4 = R_3 \times F_4$, thus $N_4 < N_3$.

Therefore, $N_2 + N_4 < N_2 + N_3 = N_1$.

As a result, when a force great enough to make the stud pin 50A fall out acts upon the stud pin 50A, because the component $F_1 \cos \theta$ exceeds the maximum friction force, the moment $N_2 + N_4$ of the forces received from the road surface can be reduced to less than the moment $N_1$ the conventional stud pin 150 receives. Consequently, occurrences of the stud pin 50A falling out from the tread portion can be reduced.

Note that the area ratio $S_2/S_1$ is preferably from 1.25 to 7.5. $S_1$ is preferably from 2.5 to 7.0 mm². The height from the upper end surface 58a to the tip end surface 60a is preferably from 0.8 to 1.5 mm. In this case, when the area ratio $S_2/S_1$ is less than 1.25, the moment of the forces the tip portion 60A receives from the road surface acting upon the stud pin 50A increases and the stud pin 50A becomes apt to fall out from the tread rubber material 18. On the other hand, for $S_2/S_1$ to be greater than 7.5, $S_1$ must be decreased. By decreasing $S_1$, the clawing force gained through the tip portion 60A coming into contact with the road surface becomes insufficient. To obtain sufficient clawing force through contact between the tip portion 60A and the road surface, $S_2/S_1$ is preferably less than 3.0.

The edges of the tip end surface 60a may be filleted. In this case, the area $S_1$ of the tip end surface 60a refers to the area of a portion having a height equal to or greater than 95% of the maximum height of the tip portion 60A protruding from the upper end surface 58a of the buried base portion 52.

Also, θ is preferably an acute angle and preferably from 30 to 60 degrees. When θ is less than 30 degrees, the clawing force obtained through the contact of the tip portion 60A with the road surface decreases. On the other hand, when θ is greater than 60 degrees, the moment of the forces the tip portion 60A receives from the road surface acting upon the stud pin 50A increases.

In such a manner, according to the stud pin 50A of the first embodiment of the present technology, the moment of the forces received from the road surface acting upon the stud pin 50A can be reduced to a greater degree than with a conventional stud pin. As a result, occurrences of the stud pin 50A falling out from the tread portion can be reduced.

Figure 7:
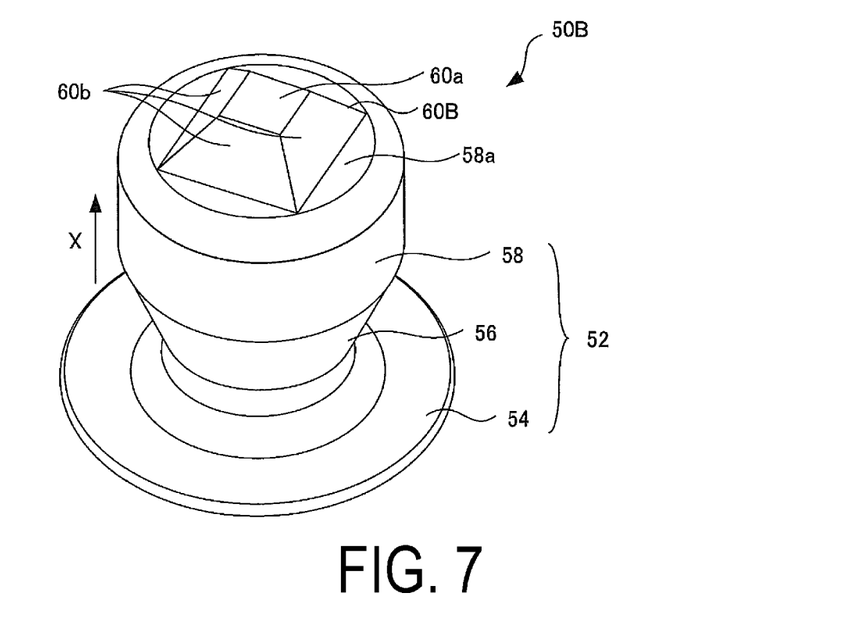
FIG. 7 is an external perspective view illustrating a stud pin 50B of a second embodiment of the present technology.

FIG. 7 is a perspective view illustrating a stud pin 50B according to a second embodiment of the present technology. The buried base portion 52 of the stud pin 50B of the present embodiment has the same shape as the stud pin 50A according to the first embodiment. However, the shape of a tip portion 60B is different from that of the tip portion 60A.

The tip portion 60B is a truncated quadrangular pyramid. The tip portion 60B includes a tip end surface 60a (an end surface in the X-direction) perpendicular to the extending direction of the buried base portion 52 (X-direction) and four inclined side surfaces 60b that extend at an inclination from respective edges of the tip end surface 60a to the upper end surface 58a of the body portion 58. The four inclined side surfaces 60b may all have the same angle of inclination or may each independently have different angles of inclination. The stud pin 50B may be fitted into a stud portion so that the extending direction of a pair of the inclined side surfaces 60b extending from a pair of opposing sides of the tip end surface 60a and the tire circumferential direction are aligned.

$S_2 > S_1$ is satisfied; where $S_1$ is the area of the tip end surface 60a and $S_2$ is the cross-sectional area of the connection portion of the tip portion 60B with the buried base portion 52, when sectioned along the plane orthogonal to the X-direction. As a result, the side surface of the tip portion 60B in the tire circumferential direction is inclined with respect to the tire circumferential direction, in a similar manner to that of the tip portion 60A of the first embodiment. As a result, in a similar manner to that of the tip portion 60A of the first embodiment, the moment of the normal force the tip portion 60B receives from the road surface can be reduced. Thus, occurrences of the stud pins 50B falling out from the tread portion can be reduced.

Note that the shape of the tip portion 60B is not limited to a truncated cone or a truncated quadrangular pyramid and may be a truncated triangular pyramid, a truncated pentagonal pyramid, or any truncated polygonal pyramid having a cross-sectional area perpendicular to the extending direction of the buried base portion 52 (X-direction) that tapers from the connection portion towards the tip end.

Figure 8:
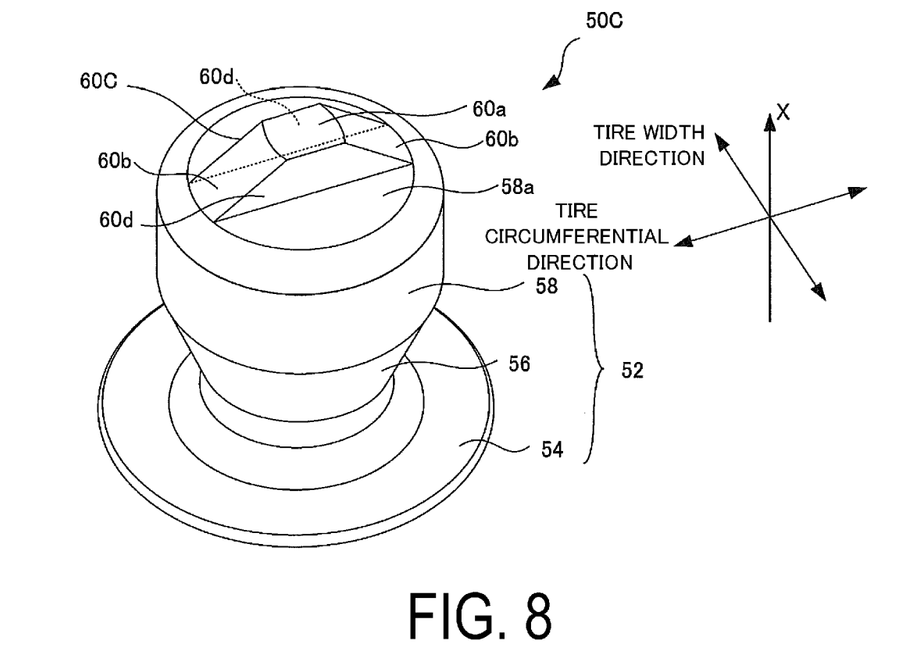
FIG. 8 is an external perspective view illustrating a stud pin 50C of a third embodiment of the present technology.

FIG. 8 is a perspective view illustrating a stud pin 50C according to a third embodiment of the present technology. The buried base portion 52 of the stud pin 50C of the present embodiment has the same shape as the stud pin 50A according to the first embodiment. However, the shape of a tip portion 60C is different.

The tip end surface 60a of the tip portion 60C of the stud pin 50C according to the present embodiment is shaped like a rectangle. The connection portion of the tip portion 60C with the buried base portion 52 has a rectangular cross section when sectioned along the plane orthogonal to the X-direction. The tip portion 60C has a trapezoidal shape when viewed from the longitudinal direction of the tip portion 60C and the direction perpendicular to the X-direction. The tip end surface 60a of the tip portion 60C may be a rectangle with the pair of sides in the lateral direction curved in an outwardly convex manner. Two inclined side surfaces 60b extend at an inclination in the tire circumferential direction from the pair of sides in the lateral direction to the upper end surface 58a of the body portion 58. The inclined side surfaces 60b have edges that extend at an inclination between the tip end surface 60a and the upper end surface 58a. Trapezoidal side surfaces 60d of the tip portion 60C are defined by the edges of the inclined side surfaces 60b, the pair of sides in the longitudinal direction of the tip end surface 60a, and the upper end surface 58a. The side surface 60d may be substantially perpendicular to the upper end surface 58a or may be inclined with respect to the upper end surface 58a in a similar manner as that of the inclined side surface 60b. The stud pin 50C is preferably installed in the stud pin installation hole 45 with the extending direction of the side surface 60d, in other words the longitudinal direction of the base of the truncated rectangular pyramid tip portion 60C (the cross section of the connection portion of the tip portion 60C with the buried base portion 52 when sectioned along the plane orthogonal to the X-direction), aligned with the tire circumferential direction. In other words, the stud pin 50C is preferably installed in the tread portion with the pair of inclined side surfaces 60b facing the tire circumferential direction. With this configuration, the moment of the forces the inclined side surface 60b receives from the road surface acting upon the stud pin 50C can be reduced to a greater degree than with a conventional stud pin. As a result, occurrences of the stud pin 50C falling out from the tread portion can be reduced.

In the present embodiment, $S_2 > S_1$ is satisfied; where $S_1$ is the area of the tip end surface 60a, and $S_2$ is the cross-sectional area of the connection portion of the tip portion 60C with the buried base portion 52, when sectioned along the plane orthogonal to the X-direction. Also, the tip portion 60C is a trapezoid when viewed from the tire width direction, and the side surface of the tip portion 60C in the tire circumferential direction is inclined with respect to the tire circumferential direction. Consequently, the moment of the normal force this inclined side surface receives from the road surface can be reduced, and occurrences of the stud pin 50C falling out from the tread portion can be reduced.

Figure 9:
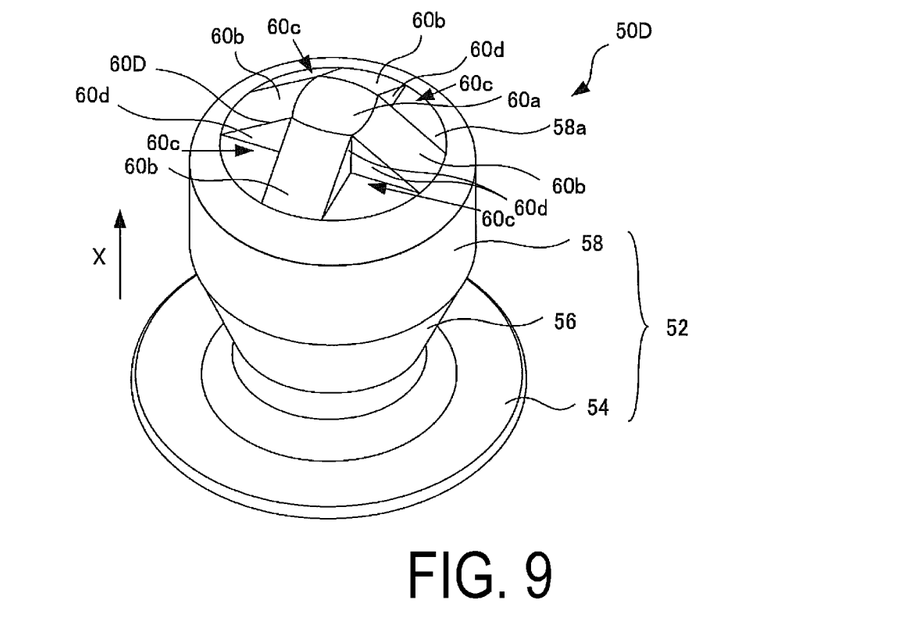
FIG. 9 is an external perspective view illustrating a stud pin 50D of a fourth embodiment of the present technology.

FIG. 9 is a perspective view illustrating a stud pin 50D according to a fourth embodiment of the present technology. The buried base portion 52 of the stud pin 50D of the present embodiment has the same shape as the stud pin 50A according to the first embodiment. However, the shape of a tip portion 60D is different.

The tip end surface 60a of the tip portion 60D is substantially quadrangular with each side curved to be outwardly convex. Four inclined side surfaces 60b extend out in the radial direction of the body portion 58 at an inclination from the sides of the tip end surface 60a to the upper end surface 58a of the body portion 58. The tip portion 60D is, as a whole, substantially cross shaped when viewed from the tire radial direction. The connection portion of the tip portion 60D with the buried base portion 52 has, as a whole, a concave-polygonal cross section shaped like a cross when sectioned along the plane orthogonal to the X-direction. The four inclined side surfaces 60b may all have the same angle of inclination or may each independently have different angles of inclination. The stud pin 50B may be fitted into a stud portion so that the extending direction of one pair of inclined side surfaces 60b extending from a pair of opposing sides of the tip end surface 60a is aligned with the tire circumferential direction. With this configuration, the moment of the forces the inclined side surfaces 60b receive from the road surface acting upon the stud pin 50D can be reduced to a greater degree than with a conventional stud pin. As a result, occurrences of the stud pin 50D falling out from the tread portion can be reduced.

The side surfaces 60d are formed extending from the edges that extend at an inclination between the tip end surface 60a and the upper end surface 58a of the inclined side surfaces 60b to the upper end surface 58a. Recessed portions 60c are defined by adjacent side surfaces 60d. The side surfaces 60d may be provided substantially perpendicular to the upper end surface 58a, or, in a similar manner to that of the inclined side surface 60b, the side surfaces 60d may be inclined with respect to the upper end surface 58a. By forming the recessed portions 60c, the number of edges of the tip portion 60D that claw into the road surface can be increased. As a result, the clawing force the stud pin 50D receives from the road surface can be enhanced.

Also, in the present embodiment, $S_2 > S_1$ is satisfied; where $S_1$ is the area of the tip end surface of the tip portion 60D, and $S_2$ is the cross-sectional area of the connection portion of the tip portion 60D with the buried base portion 52, when sectioned along the plane orthogonal to the X-direction. As a result, the side surface of the tip portion 60D in the tire circumferential direction is inclined with respect to the tire circumferential direction. Consequently, in a similar manner to that of the stud pin 50A according to the first embodiment, the moment of the normal force the tip portion 60D receives from the road surface acting upon the stud pin 50D can be reduced. As a result, occurrences of the stud pin 50D falling out from the tread portion can be reduced.

Figure 10:
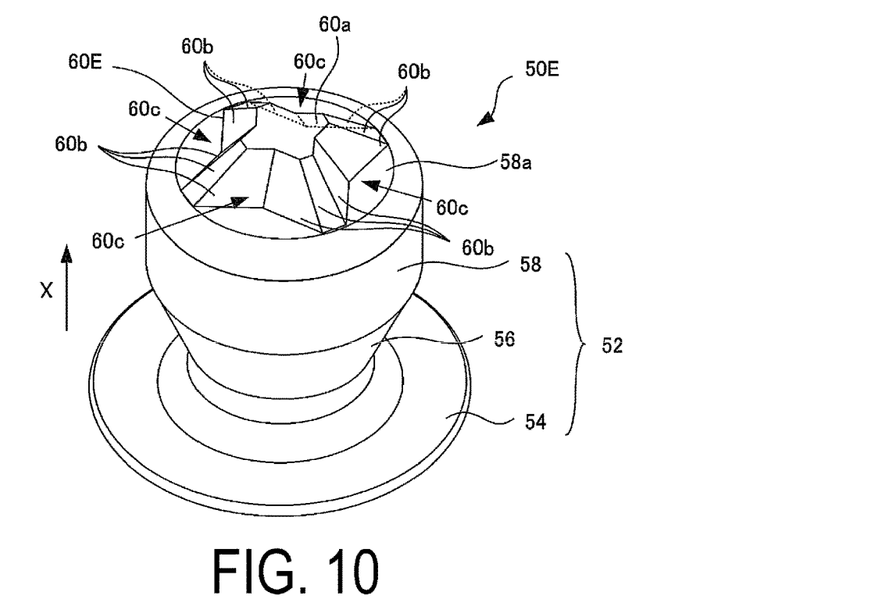
FIG. 10 is an external perspective view illustrating a stud pin 50E of a fifth embodiment of the present technology.

FIG. 10 is a perspective view illustrating a stud pin 50E according to a fifth embodiment of the present technology. The buried base portion 52 of the stud pin 50E of the present embodiment has the same shape as the stud pin 50A according to the first embodiment. However, the shape of a tip portion 60E is different.

The tip portion 60E is the portion that, as illustrated in FIG. 4, protrudes past the tread surface when the stud pin 50E is fitted into the tread portion, comes into contact with the road surface, and claws into the ice. The tip portion 60E is a truncated concave-polygonal pyramid, protruding from the upper end surface 58a of the buried base portion 52 with a trapezoidal cross section. The tip portion 60E includes a tip end surface 60a (an end surface in the X-direction) perpendicular to the extending direction of the buried base portion 52 (X-direction).

Note that the tip end surface 60a, as well as the cross section of the connection portion of the tip portion 60E with the buried base portion 52 when sectioned along the plane orthogonal to the X-direction are preferably concave polygons with at least one internal angle greater than 180 degrees. In particular, the tip end surface 60a, as well as the cross section of the connection portion of the tip portion 60E with the buried base portion 52 when sectioned along the plane orthogonal to the X-direction is preferably, as a whole, a concave polygon shaped like a cross. As concave polygons have a greater sum of the lengths of the sides than circles or convex polygons with the same area, by the tip end surface 60a being shaped like a concave polygon, the number of edges of the tip portion 60E that claw into the road surface can be increased. As a result, the clawing force the stud pin 50E receives from the road surface can be enhanced. For example, the tip end surface 60a can be cross shaped or star shaped.

The cross section of the tip portion 60E in the direction orthogonal to the X-direction may have a different shape to the tip end surface 60a, however a similar shape to the tip end surface 60a is preferable.

In the present embodiment, $S_2 > S_1$ is satisfied; where $S_1$ is the area of the tip end surface 60a, and $S_2$ is the cross-sectional area of the connection portion of the tip portion 60E with the buried base portion 52, when sectioned along the plane orthogonal to the X-direction. As a result, the side surface of the tip portion 60E in the tire circumferential direction is inclined with respect to the tire circumferential direction. Consequently, in a similar manner to that of the embodiments described above, the moment of the normal force the tip portion 60E receives from the road surface can be reduced, and occurrences of the stud pin 50A falling out from the tread portion can be reduced.

Twelve inclined side surfaces 60b extend at an inclination from the sides of the tip end surface 60a to the upper end surface 58a of the body portion 58.

The recessed portions 60c are defined by at least one pair of the inclined side surfaces 60b extending from the sides of the tip end surface 60a that form an internal angle greater than 180 degrees. By forming the recessed portions 60c, the number of edges of the tip portion 60E that claw into the road surface can be increased. As a result, the clawing force the stud pin 50E receives from the road surface can be enhanced.

Figure 11:
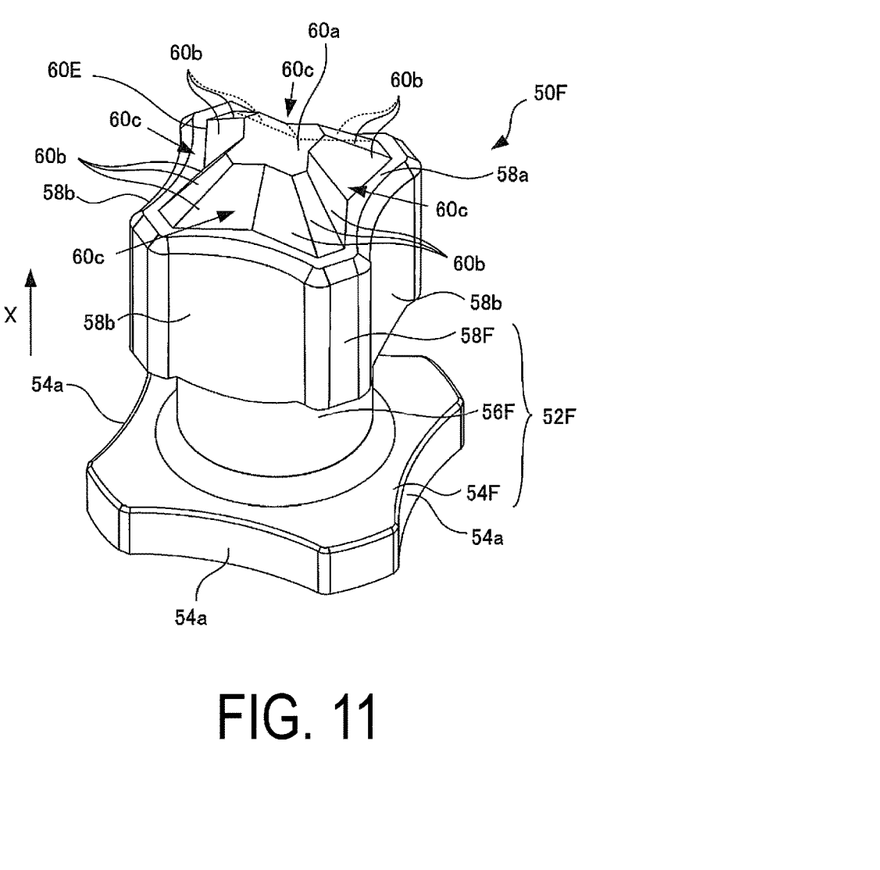
FIG. 11 is an external perspective view illustrating a stud pin 50F of a sixth embodiment of the present technology.

FIG. 11 is a perspective view illustrating a stud pin 50F according to a sixth embodiment of the present technology. A tip portion 60E of the stud pin 50F of the present embodiment has the same shape as the tip portion 60E of the stud pin 50E according to the fifth embodiment. However, the shape of a buried base portion 52F is different.

The buried base portion 52F of the stud pin 50F includes a bottom portion 54F, a shank portion 56F, and a body portion 58F. The bottom portion 54F, the shank portion 56F, and the body portion 58F are formed in the stated order in the X-direction.

A recessed portion 54a is formed in the outer peripheral surface of the bottom portion 54F that comes into contact with the side surface of the stud pin installation hole 45. Specifically, the cross section of the bottom portion 54F is substantially quadrangular with filleted corners. The four sides of the substantially quadrangular shape are recessed to form four of the recessed portions 54a. The cross section of the bottom portion 54F may not be substantially quadrangular with filleted corners and may be substantially triangular, pentagonal, hexagonal, or any substantially polygonal shape. By the bottom portion 54F being substantially polygonal, rotational motion of the stud pin 50F about the central axis thereof that is aligned with the X-direction is prevented or minimized. Note that the dull corners of the bottom portion 54 achieved by filleting the corners can prevent damage to the side surface of the stud pin installation hole 45. In this case, the recessed portion 54a is preferably formed by at least one side of the substantially polygonal shape being recessed. Of course, a plurality of recessed portions 54a may be formed by a portion of or all of the sides of the substantially polygonal shape, for example two sides, three sides, four sides, five sides, six sides, and the like, being recessed. By forming the recessed portion 54a, the surface area per unit volume of the bottom portion 54F can be increased. As a result, the surface contact area with the tread rubber material 18 of the tread portion is increased and the friction force preventing the stud pin 50F from moving can be increased. Also, by the tread rubber material 18 filling the recessed portion 54a, rotational motion about the central axis of the stud pin 50F, which is aligned with the X-direction, is prevented or minimized.

The shank portion 56F is the portion that connects the body portion 58F to the bottom portion 54F. The shank portion 56F is cylindrical with a diameter less than the maximum outer diameter of the bottom portion 54F and that of the body portion 58F. As a result, the shank portion 56 is formed as a recessed portion relative to the body portion 58 and the bottom portion 54F, and the bottom portion 54F and the body portion 58F are formed like flanges. Recessed portions are not formed in the outer peripheral surface of the shank portion 56F.

The body portion 58F is located between the shank portion 56F and the tip portion 60F and is the flange portion connected to the tip portion 60F. A recessed portion 58b is formed on the outer peripheral surface of the body portion 58F which is pressed by the side surface of the stud pin installation hole. By the tread rubber material 18 of the tread portion being brought into contact with and pressing the outer peripheral surface, movement of the stud pin 50F is prevented or minimized by friction force.

Explaining the body portion 58F in detail, the body portion 58F has a cross section perpendicular to the X-direction that is substantially quadrangular having filleted corners with four of the recessed portions 58b formed by the four sides being recessed. In the present embodiment, four of the recessed portion 58b are provided on the outer peripheral surface. However, at least one recessed portion 58b, in other words one, two, three, and the like, may be provided. The cross section of the body portion 58F may not be substantially quadrangular with filleted corners and may be substantially triangular, pentagonal, hexagonal, or any substantially polygonal shape. By the body portion 58F being substantially polygonal, rotational motion of the stud pin 50F about the central axis thereof that is aligned with the X-direction is prevented or minimized. Note that the dull corners of the body portion 58F of the stud pin 50F achieved by filleting the corners can prevent damage to the side surface of the stud pin installation hole 45.

In this case, the recessed portion 58b is preferably formed by at least one side of the substantially polygonal shape being recessed. Of course, a plurality of recessed portions 58b may be formed by a portion of or all of the sides of the substantially polygonal shape, for example two sides, three sides, four sides, five sides, six sides, and the like, being recessed. By forming the recessed portion 58b, the surface area per unit volume of the body portion 58F can be increased. As a result, the surface contact area with the tread rubber material 18 of the tread portion is increased and the friction force preventing the stud pin 50F from moving can be increased. Also, by the tread rubber material 18 filling the recessed portion 58b, rotational motion about the central axis of the stud pin 50F, which is aligned with the X-direction, is prevented or minimized.

The body portion 58F is embedded in the tread rubber material 18, with the upper end surface 58a of the body portion 58 being exposed, flush with the tread surface when the stud pin 50F is fitted into the tire 10.

According to the present embodiment, a similar result to that of the stud pin 50E according to the fifth embodiment can be achieved, and rotational motion about the central axis of the buried base portion 52F, which is aligned with the X-direction, can be prevented or minimized. As a result, occurrences of the stud pin 50F falling out from the tread portion can be reduced.

Note that, as illustrated in FIG. 11, the recessed portion 54a, the recessed portion 58b, and the recessed portion 60c are preferably provided arranged in the same direction with respect to the central axis of the stud pin 50F.

EXAMPLES

To test the effects of the stud pins of the embodiments, stud pins of a Comparative Example and Working Examples 1 to 9 described below were installed in the tires 10 having the configuration illustrated in FIG. 1 and FIG. 2. For each stud pin, the surface area $S_1$ of the tip end surface 60a of the tip portion 60 was 4.0 mm$^2$, and the height from the upper end surface 58a of the buried base portion 52 to the tip end surface 60a was 1.2 mm. The shape of the buried base portion 52 was the same for each stud pin (the shape illustrated in FIG. 3, FIG. 7, and FIG. 10).

Next, the tires 10 described above were mounted on a passenger vehicle, and the braking performance on ice, representing performance on ice, and stud pin resistance to falling out (difficulty to fall out) was tested.

The size of each manufactured tire was 205/55R16. The passenger vehicle used was a front wheel drive sedan type passenger vehicle with an engine displacement of 2000 cc. The internal pressure condition of the tires was 230 (kPa) for both the front wheels and rear wheels. The load condition of the tires was a 450 kg load on the front wheels and a 300 kg load on the rear wheels.

The stud pins of the Comparative Example and Working Examples 1 to 6 had a varied cross-sectional area $S_2$ of the connection portion of the tip portion with the buried base portion, and thus $S_2/S_1$ varied.

Comparative Example

The cylindrical tip portion illustrated in FIG. 5 was used in the stud pin of the Comparative Example. In other words, the shape of the tip end surface (hereinafter referred to as "tip end shape") was circular. Also, $S_2/S_1$ was set to $S_2/S_1=1.00$.

Working Examples 1 to 9

The truncated conical tip portion illustrated in FIG. 3 was used in the stud pins of Working Examples 1 to 9. In other words, the shape of the tip end surface (hereinafter referred to as "tip end shape") was circular.

$S_2/S_1$ was set to 1.10 in Working Example 1, 1.25 in Working Example 2, 1.50 in Working Example 3, 2.50 in Working Example 4, 3.00 in Working Example 5, 3.25 in Working Example 6, 6.50 in Working Example 7, 7.00 in Working Example 8, and 7.5 in Working Example 9.

Working Examples 10 to 12

In Working Examples 10 to 12, $S_2/S_1$ was set to a constant value (2.00) and the tip end shape was varied. Specifically, in Working Example 10, the tip end shape was circular, as illustrated in FIG. 3; in Working Example 11, the tip end shape was quadrangular, as illustrated in FIG. 7; and in Working Example 12, the tip end shape was a cross shape, as illustrated in FIG. 10. In Working Example 11, the stud pins were installed in the tread portion so that a pair of the inclined side surfaces 60b faced the tire circumferential direction. In Working Example 12, the stud pins were installed in the tread portion so that any one of the pairs of the inclined side surfaces 60b faced the tire circumferential direction.

Braking Performance on Ice

The braking performance on ice of each Example was obtained as follows:

the distance (breaking distance) the passenger vehicle travelling at 40 km/hour takes to stop when the brake pedal is pushed to the maximum travel point with a fixed force was measured a plurality of times (five times) and the average value of the measurement values was obtained.

The inverse value of the average value of the measurement values of the braking distance was indexed based on the inverse value of the average value of the measurement values of the braking distance of the Comparative Example (index of 100).

The results are shown in Tables 1 and 2.

Stud Pin Resistance to Falling Out

The stud pin resistance to falling out for each Example was obtained as follows:

the proportion of the number of stud pins remaining in the tread portion to the total number of fitted stud pins was obtained after the vehicle had travelled 1000 km on a dry road surface including asphalt road surfaces or concrete road surfaces.

The proportion of remaining stud pins was indexed based on the proportion of remaining stud pins in the Comparative Example (index of 100).

The results are shown in Tables 1 to 3.

TABLE 1

|  | Comparative Example | Working Example 1 | Working Example 2 | Working Example 3 | Working Example 4 | Working Example 5 | Working Example 6 |
|---|---|---|---|---|---|---|---|
| $S_2/S_1$ | 1.00 | 1.10 | 1.25 | 1.50 | 2.50 | 3.00 | 3.25 |
| Tip end shape | Circular | Circular | Circular | Circular | Circular | Circular | Circular |
| Performance on ice | 100 | 105 | 113 | 112 | 111 | 110 | 109 |
| Resistance to falling out | 100 | 102 | 106 | 108 | 112 | 115 | 110 |

TABLE 2

|  | Working Example 7 | Working Example 8 | Working Example 9 |
|---|---|---|---|
| $S_2/S_1$ | 6.50 | 7.00 | 7.50 |
| Tip end shape | Circular | Circular | Circular |
| Performance on ice | 108 | 106 | 102 |
| Resistance to falling out | 108 | 107 | 105 |

TABLE 3

|  | Working Example 10 | Working Example 11 | Working Example 12 |
|---|---|---|---|
| $S_2/S_1$ | 2.00 | 2.00 | 2.00 |
| Tip end shape | Circular | Quadrangular | Cross shaped |
| Performance on ice | 109 | 112 | 114 |
| Resistance to falling out | 110 | 112 | 116 |

As can be seen by comparing the Comparative Example and Working Examples 1 to 9 shown in Table 1 and Table 2, when $S_2/S_1>1$ is satisfied, the braking performance on ice increases and the resistance to falling out of the stud pins increases. In particular, when $1.25 \leq S_2/S_1 \leq 7.00$ is satisfied, the braking performance on ice and the resistance to falling out of the stud pins can be further increased. Also, when $1.25 \leq S_2/S_1 \leq 3.00$ is satisfied, the braking performance on ice and the resistance to falling out of the stud pins can be even further increased.

As can be seen by comparing Working Examples 10 to 12 shown in Table 3, a quadrangular tip end shape achieves greater braking performance on ice and resistance to falling out of stud pins than a circular tip end shape. Also, a cross shaped tip end shape achieves even greater braking performance on ice and resistance to falling out of stud pins than a quadrangular tip end shape.

The foregoing has been a detailed description of the stud pin and pneumatic tire of the present technology. However, the pneumatic tire of the present technology is not limited to the above embodiments, and may be enhanced or modified in various ways within the scope of the present technology.

The invention claimed is:

1. A pneumatic tire fitted with a stud pin configured to fit into a stud pin installation hole on a tread portion, the stud pin comprising:
   a buried base portion extending in a direction, the buried base portion securing the stud pin in the tread portion by being pressed by a side surface of the stud pin installation hole upon the stud pin being embedded in the stud pin installation hole; and
   a tip portion connected to an end portion of the buried base portion in the extending direction, the tip portion protruding past the tread portion and coming into contact with a road surface upon the buried base portion being embedded in the stud pin installation hole;
   the tip portion comprising a tip end surface perpendicular to the extending direction of the buried base portion;
   a pair of inclined side surfaces extending from the tip end surface to the buried base portion, an angle between which and the tip end surface being obtuse; and
   a pair of side surfaces adjacent to the inclined side surfaces, the side surfaces extending from the tip end surface and the inclined side surfaces to the buried base portion, and being orthogonal to the tip end surface;
   the buried base portion comprises a flat surface from which the tip portion protrudes;
   the tip end surface is parallel to the flat surface;
   a connection portion of the tip portion with the buried base portion having a cross-sectional area in a plane orthogonal to the extending direction of the buried base portion greater than an area of the tip end surface;
   the tip end surface having a rectangular shape, the pair of inclined side surfaces extending from two opposing sides to the buried base portion in opposite directions of each other along a tire circumference direction, the pair of side surfaces orthogonal to the tip end surface extending from other two opposing sides to the buried base portion;
   the extending direction of the inclined side surfaces is consistent with a longitudinal direction of the tip portion; and
   the stud pin being fitted into the stud pin installation hole so that the longitudinal direction is consistent with the tire circumference direction.

2. The pneumatic tire according to claim 1, wherein an area ratio $S_2/S_1$ is from 1.25 to 7.5, where $S_1$ is the area of the tip end surface and $S_2$ is the cross-sectional area of the connection portion.

3. The pneumatic tire according to claim 1, wherein
   an angle of inclination of the inclined side surface with respect to the flat surface of the buried base portion is from 30 to 60 degrees.

4. The pneumatic tire according to claim 2, wherein
   an angle of inclination of the inclined side surface with respect to the flat surface of the buried base portion is from 30 to 60 degrees.

5. The pneumatic tire according to claim 1, wherein the rectangular shape has two opposing first sides and two opposing second sides a length of which are longer than a length of the first sides; and
   the inclined side surfaces extend from the first sides to the buried base portion and the side surfaces adjacent to the inclined side surfaces extend from the second sides to the buried base portion.

* * * * *